United States Patent [19]

Nakamura et al.

[11] 4,031,000

[45] June 21, 1977

[54] DIAPHRAGM FOR ELECTROLYTIC PRODUCTION OF CAUSTIC ALKALI

[75] Inventors: Tadashi Nakamura; Hisami Hagiwara; Yoshikazu Kokubu, all of Iwaki, Japan

[73] Assignee: Kureha Kagaku Kogyo Kabushiki Kaisha, Tokyo, Japan

[22] Filed: May 30, 1974

[21] Appl. No.: 474,820

[30] Foreign Application Priority Data

June 7, 1973 Japan ............................ 48-64204

[52] U.S. Cl. ............................ 204/252; 204/258; 204/266; 204/296
[51] Int. Cl.[2] ...................... C25B 1/14; C25B 13/02
[58] Field of Search .......... 204/295, 252, 301, 296, 204/98, 181, 299, 300, 256, 258, 266

[56] References Cited

UNITED STATES PATENTS

| | | | |
|---|---|---|---|
| 2,293,928 | 8/1942 | Beal | 204/296 X |
| 2,987,472 | 6/1961 | Kollsman | 204/296 X |
| 3,098,802 | 7/1963 | Beer | 204/1 |
| 3,147,150 | 9/1964 | Mendelsohn et al. | 204/296 X |
| 3,214,362 | 10/1965 | Juda | 204/301 X |
| 3,276,598 | 10/1966 | Michaels et al. | 204/296 X |
| 3,749,655 | 7/1973 | Hodgdon, Jr. | 204/301 X |
| 3,775,308 | 11/1973 | Yasuda | 204/296 X |
| 3,784,460 | 1/1974 | Le Bras et al. | 204/181 X |
| 3,847,762 | 11/1974 | Strain | 204/98 |

OTHER PUBLICATIONS

Pattison, Chem. Engin. News, June 3, 1968, pp. 38–41.

*Primary Examiner*—Arthur C. Prescott
*Attorney, Agent, or Firm*—Flynn & Frishauf

[57] ABSTRACT

A diaphragm for electrolytic production of caustic alkali which consists of dual microporous layers provided on the anode and cathode sides, wherein the anode side microporous layer is made of an acid-resistant material 0.01 to 0.3 millimeter thick bored with micropores having a mean diameter of 0.05 to 1.5 microns, and the cathode side microporous layer is formed of an alkali-resistant material 1 to 6 millimeters thick bored with micropores having a diameter of 3 to 100 microns.

4 Claims, 3 Drawing Figures

DIAPHRAGM FOR ELECTROLYTIC PRODUCTION OF CAUSTIC ALKALI

This invention relates to an electrolytic diaphragm and more particularly to a diaphragm for electrolytic production of caustic alkali.

There will now be described a large scale electrolytic process of preparing caustic soda most widely accepted in the industry. A diaphragm now used in electrolyzing brine is mostly made of chrysotile type asbestos. However, this diaphragm is not yet fully satisfactory. The reason is that the chyrsotile type asbestos easily affected by acidic liquor presents noticeable changes in its properties if used a long time period; generally swells during electrolysis, leading to a gradual decline in the mechanical strength; consequently agitation of the electrolyte resulting from sudden changes in the flow rate thereof and the up-stream of evolved gases causes the fibers of the swollen asbestos constituting the surfaces of the asbestos plate to peel off, giving rise to its breakage or holes therein; and the conventional crysotile diaphragm generally has a short effective life, demanding utmost care in handling.

To cite previous literature, the Japanese Patent Publication 25267/1971 originating with the British patent application having the number 37,174/65 already proposed a diaphragm formed of an about 65% porous sheet of polytetrafluoroethylene, which was claimed to be prominently corrosion-resistant, mechanically strong and free from swelling. For high current efficiency, an electrolytic diaphragm is generally demanded to be at least 1 mm thick. However, this proposed polyolefinic diaphragm has far higher electrical resistance than an asbestos type, even if formed in a thickness of 1 mm, failing to be put to practical application.

It is accordingly the object of this invention to provide a diaphragm for electrolytic production of caustic alkali which is free from swelling, and has a prominent mechanical strength, relatively low electrical resistance, stable effective life and high current efficiency.

This object can be attained by providing an electrolytic diaphragm which is formed, according to this invention, of dual microporous layers, wherein the anode side microporous layer is made of an acid-resistant material 0.01 to 0.3 millimeter thick bored with a great number of micropores having a mean diameter of 0.05 to 1.5 mircons and the cathode side microporous layer is formed of an alkali-resistant material 1 to 6 millimeters thick bored with a great number of micropores having a mean diameter of 3 to 100 microns.

Other important objects and advantageous features of the invention will be apparent from the following description, wherein specific embodiments of the invention are set forth in detail, reference being had to the drawings in which.

Figure 1:
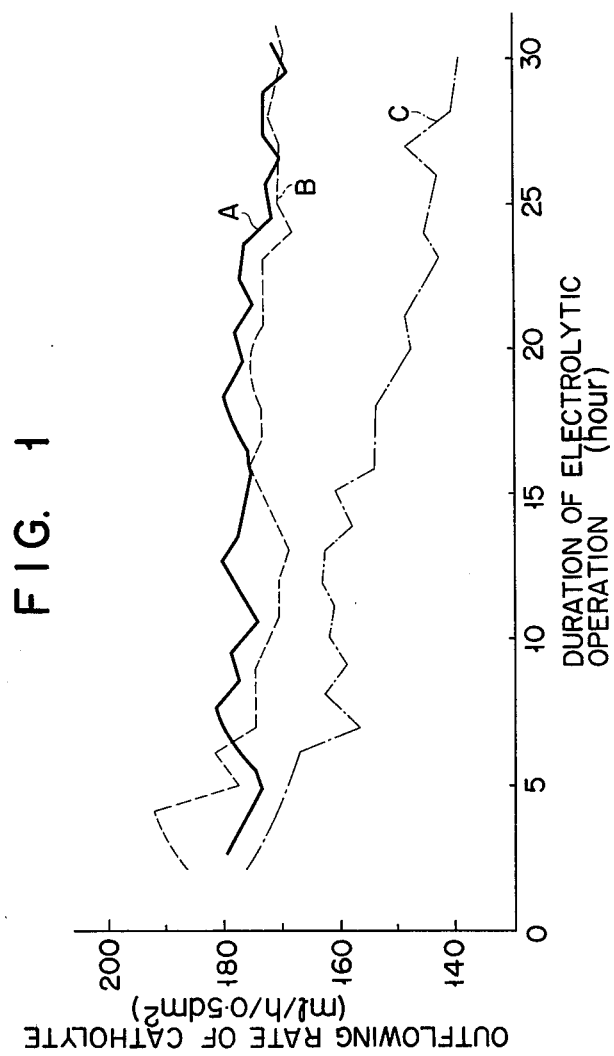
FIG. 1 is a graph showing the relationship between the duration of electrolysis and the outflowing rate of catholyte in Example 1 and References 1 and 2.

An electrolytic diaphragm for producing caustic alkali is subject to various requirements which should be taken into consideration.

First, a diaphragm should be sufficiently porous to be permeable to electrolyte. Since the permeant velocity of electrolyte through the diaphragm is largely governed by current density, said permeant velocity should be properly controlled to match the current density applied. To this end, a diaphragm should be bored with a great number of micropores having a proper diameter. A diaphragm having too fine a mean micropore diameter becomes less permeable to electrolyte and makes electrolysis impossible, unless a level difference between the anolyte and catholyte is increased more than necessary or current density is decreased. In contrast, a diaphragm bored with micropores having an unduly large mean diameter requires a level difference between the catholyte and anolyte to be very much reduced for proper permeability to electrolyte, presenting difficulties in controlling said permeability. Therefore, the mean micropore diameter should fall within a specified range to allow electrolyte to pass through a diaphragm at a proper rate.

Secondarily, the magnitude of voltage applied in the diaphragm type electrolysis is an important factor governing the economy of said electrolytic process. To carry out electrolytic operation at a low voltage, it is necessary to decrease intraelectrode ohmic resistance as much as possible. In consequence, a diaphragm itself must have least possible electrical resistance. A diaphragm whose electrical resistance is, as a rule, inversely proportional to its porosity is desired to have as large a porosity as possible.

Thirdly, the diaphragm type electrolysis is demanded to have as fully high current density as the general type of electrolysis. A drop in current density mainly originates with the fact that part of the hydroxy ions ($OH^-$) generated in the cathode chamber diffuse to the anode side through the diaphragm. Since, for the object of electrolysis, it is not desired to reduce the concentration of caustic soda produced in the cathode chamber, said diffusion may be controlled, for example, by providing an appreciably thick diaphragm. Though such diaphragm is not preferred from the standpoint of minimizing electrical resistance, yet it is necessary to increase the thickness of a diaphragm to a certain extent for high current efficiency.

Fourthly, the material of a diaphragm should be stable chemically as well as thermally to attain a long run of electrolysis.

From the standpoint of the above-mentioned requirements, we have made experiments in search for a novel type of electrolytic diaphragm capable of fully meeting said requirements. The inventors prepared for trial a diaphragm bearing substantially uniform micropores from polyolefinic materials and electrolyzed an aqueous solution of pure sodium chloride in an electrolytic cell using said diaphragm, obtaining expected results so far as it goes. Details of this experiment are described in Reference 1 of this specification, the results being set forth in FIG. 1.

However, practical electrolysis of industrial salt is accompanied with the drawback that the electrolyte, though purified, still contains calcium ions and magnesium ions amounting to 10 ppm, respectively. To simulate practical electrolysis, therefore, we have experimentally electrolyzed the aforesaid aqueous solution of pure sodium chloride to which calcium ions were purposely added, using the polyolefinic porous diaphragm. In this case, the permeant velocity of the electrolyte prominently decreased, as in Reference 2, as time went on after introduction of electrolytic current. Investigation of this event showed that calcium ions were precipitated in the alkaline substance produced in a diaphragm to plug its micropores.

This invention has been accomplished by further studies for elimination of the above-mentioned difficulties. The diaphragm of this invention characteristically consists of dual layers. Said dual layers comprise one thin anode side layer formed of stable material to anolyte with a maximum thickness of 0.3 mm and bored with micropores having a mean diameter of 0.05 to 1.5 microns and another cathode side layer made of stable material to catholyte with a thickness of 1 to 6 mm and bored with micropores having a mean diameter of 3 to 100 microns. The thin anode side layer is placed in a substantially neutral or slightly acidic atmosphere and consequently saved from the deposition of salts of calcium and magnesium, keeping the permeant velocity of electrolyte through the entire diaphragm unchanged. On the other hand, the cathode side layer can have its relatively large micropores prevented from being plugged with salts of calcium and magnesium even when the salts settle in said layer, thus little impairing the permeant velocity of electrolyte.

The dual layers may be formed into an integral microporous sheet or plate. Further, it is possible to prepare in advance separate sheets or plates for the anode and cathode sides respectively, and later simply superpose said sheets or plates or bond them together by an adhesive.

Generally, the catholyte consists of an alkaline solution containing as high a concentration of NaOH as about 10%. The anolyte consists of a weak acidic solution in which chlorine gas is dissolved with a pH value of about 3. Accordingly, it is supposed that the liquor held in the diaphragm itself is mostly formed of an alkaline solution and that a neutral zone is present near the surface of the anode side layer. With a prior art single layer diaphragm bored with micropores having a substantially uniform diameter, plugging seems to take place at the part of the diaphragm slightly apart from the neutral zone toward the cathode side, namely, in a zone containing sufficiently concentrated hydroxy ions to give rise to the precipitation of salts of calcium and magnesium. If, in this case, that part of the diaphragm constituting a zone in which plugging is likely to occur has appreciably large micropores, then a gradual fall in the permeant velocity of electrolyte should be minimized, as naturally expected. As previously described, however, use of a single layer diaphragm bored with micropores having an unduly large main diameter would practically present difficulties in controlling the permeant velocity of electrolyte by adjusting a level difference between the catholyte and anolyte, making it necessary to effect said control by some other means.

We have discovered that said control can be attained by laying a cathode side thick diaphragm bored with micropores having a large mean diameter with an extremely thin microporous layer of anode side bored with micropores having a small mean diameter. However, it would be insignificant to provide said thin layer for control of the permeant velocity of electrolyte on the cathode side of the diaphragm, because sediments deposited in the cathode side layer would close the fine micropores thereof. If, however, said finely bored thin layer formed on the anode side of the diaphragm is unduly thick, then said layer would be subject to plugging because part of the layer is placed in an anolyte of considerably high alkalinity to produce sediments therein. Our experiments showed that said thin layer should be 0.3 mm thick at maximum. Provided the permeant velocity of electrolyte could be properly controlled, the layer provided on the anode side of the diaphragm would be preferred to be as thin as possible. It was experimentally found that the thickness of said anode side thin layer could be reduced to 0.01 millimeter. The thinning of the above-mentioned anode side layer is subject to a certain limitation from the standpoint of maintaining the mechanical strength of the independent sheet. Where, therefore, a mechanically strong layer of anode side is to be prepared, it is considered necessary to devise a proper means of for example, joining the anode side layer and the cathode side layer into an integral body.

The cathode side layer is bored with micropores having a large mean diameter, and has its minimum thickness limited from the required current efficiency for electrolysis. It was experimentally found that the cathode side layer having a smaller thickness than 1 mm led to the rapid diffusion of hydroxy ions into the diaphragm, presenting difficulties in maintaining a higher current efficiency than 90%. The cathode side layer also has its maximum thickness limited from the standpoint of reducing the electrical resistance of the diaphragm. It was discovered that, if said thickness increased over 6 mm, then the electrical resistance of the resultant diaphragm would exceed an allowable limit, even though the cathode side layer might be bored with considerably large micropores. Moreover, the cathode side layer having a larger thickness than 6 mm would attain little increase in current efficiency. It is concluded, therefore, from all the above considerations, that a cathode side layer bored with micropores having a large mean diameter should preferably have a thickness ranging between 1 and 6 mm.

It was found that the mean diameter of the micropores of the cathode side layer should be 3 microns at minimum from the necessity of saving the permeant velocity of electrolyte from the effect of sediments deposited in said micropores. To eliminate plugging the cathode side layer is preferred to have micropores having as large a mean diameter as possible. If, however, said mean diameter is excessively large, then the electrolyte permeating in the present double-layer diaphragm will likely present a turbulent flow, promoting the diffusion of $OH^-$ ions into the diaphragm and a resultant decline in current efficiency. Further, bubbles of hydrogen gas evolved on the cathode intrude into the diaphragm to increase its electrical resistance. We have experimentally found that an upper limit to the mean micropore diameter of the cathode side layer which is least likely to bring about the above-mentioned harmful effects should be preferred to be 100 microns.

To obtain a desired permeant velocity of electrolyte, the mean micropore diameter of the anode side layer is determined by the relationship between the thickness of said anode side layer and the different levels of the anolyte and catholyte. According to this invention, it was found that an upper limit to said mean micropore diameter was chosen to be 1.5 microns. Though a desired permeant velocity of electrolyte may be provided by reducing the porosity of the anode side layer, should said mean micropore diameter exceed said upper limit, yet the decreased porosity would be disadvantageous due to the electrical resistance of a diaphragm being unnecessarily increased. Though not subject to any particular restriction, a lower limit to said mean micropore diameter is chosen to be 0.05 micron as viewed technically, as long as the permeant velocity of electrolyte is not decreased substantially.

Where electrolysis is practically carried out using a diaphragm constructed according to this invention, the properties of the material of the diaphragm have great importance. In electrolysis of brine, the catholyte consists of a concentrated alkaline solution and the anolyte is formed of a weak acidic solution in which chlorine gas is dissolved. Further, the electrolytic cell is often operated at a higher temperature than 90° C to reduce its cell voltage. A single diaphragm material withstanding a long operation conducted under the above-mentioned conditions includes synthetic resins such as polytrifluorochloroethylene, polytetrafluoroethylene, polyvinylidene fluoride, tetrafluoroethylene-hexafluoroethylene copolymer, ethylene-trifluoroethylene copolymer, ethylenetetrafluoroethylene copolymer, ethylene-trifluorochloroethylene copolymer and tetrafluoroethylene-perfluoroacrylate copolymer. Further, with a diaphragm consisting of dual layers according to this invention, the anode side layer can be formed of material exceedingly resistant to acids, particularly to corrosion by chlorine and the cathode side layer can be made of material highly resistant to alkali. The high chlorine resistant material may be prepared from polychlorinated resins such as chlorinated polyvinyl chloride. The high alkali-resistant material may consist of polyolefinic resins such as polyethylene, polypropylene, polybutene and polymethyl pentene, ceramics or asbestos cloth.

The foregoing description refers to the case where an aqueous solution of sodium chloride normally containing ions of calcium and magnesium was electrolyzed. However, this invention is also applicable to electrolysis of an aqueous solution of other industrial alkali salts.

The diaphragm of this invention will be more fully understood by reference to the following examples and references. Unless otherwise indicated, all parts and percentages are by weight.

EXAMPLE 1

A diaphragm was prepared from two microporous films of polyvinylidene fluoride resin having different micropore diameter and thickness, respectively. An aqueous solution of sodium chloride containing calcium ions as an impurity was electrolyzed in an electrolytic cell using the above-mentioned dual-layer diaphragm. Each microporous film was prepared by the undermentioned processes.

I. Preparation of cathode side film 32 parts of polyvinylidene fluoride, 68 parts of calcium sulfite hemihydrate and 10 parts of dimethyl phthalate were kneaded together on a roll. The kneaded mass was pressed into a plate 3 mm thick, which in turn was stretched and extended in one direction to 1.2 fold magnification passed between a pair of pressure rolls having its surface temperature maintained at 140° C. The rolled mass was stretched in the same direction to an extent twice the original length at the same temperature as mentioned above. A strip thus obtained was soaked one day in hydrochloric acid at 3N concentration to dissolve out calcium sulfite from the strip. After water-washing and drying, the strip provided a cathode side film 2.4 mm thick bored with micropores having a mean diameter of 5 microns.

II. Preparation of anode side film 25 parts of polyvinylidene fluoride, 75 parts of heavy calcium carbonate and 10 parts of dimethyl phthalate were kneaded together on a roll. The kneaded mass was pressed into a plate 1 mm thick. The plate was passed between a pair of pressure rolls whose surface temperature was maintained at 140° C and extended in one direction until the plate had its thickness reduced to 0.2 mm. A strip obtained was soaked one day in hydrochloric acid at 3N concentration to dissolve out calcium carbonate from the strip. After water-washing and drying, the strip provided a anode side film 0.2 mm thick bored with micropores having a mean diameter of 0.8 micron.

III. Electrolytic operation

Electrolysis was carried out in an electrolytic cell using a diaphragm prepared by superposing cathode side and anode side films.

The electrolytic cell used had its cathode formed of a perforated iron plate having an area of 0.5 $dm^2$, and its anode prepared from graphite. The electrolytic cell was operated with current density of 24 A/$dm^2$ at a temperature of 60° C, with an intraelectrode distance set at 12.5 mm. An electrolyte used consisted of an aqueous solution of sodium chloride prepared using a pure reagent and a sufficient amount of calcium chloride purposely added to adjust the concentration of calcium ions in said aqueous solution to 18.4 ppm. The electrolysis continued 30 hours under the above-mentioned conditions. The cell voltage was kept within the range of 4.12 to 4.15 volts and the outflowing rate of catholyte was maintained within the range of 170 to 180 ml per hour. When measured after completion of electrolysis the current efficiency amounted to 99.2%. During this electrolysis the level difference between the anolyte and catholyte remained at 70 mm.

The outflowing rate of the catholyte changed with time as indicated by the curve A of FIG. 1. As apparent from this FIG. 1, the curve A is improved over the similar curve C of undermentioned Reference 2 to a larger extent.

REFERENCE 1

A diaphragm was prepared from a single piece microporous plate of polyethylene resin bored with micropores having a uniform diameter. Electrolysis was effected of an aqueous solution of sodium chloride free from ions of calcium and magnesium.

14 parts of polyethylene resin, 86 parts of heavy calcium carbonate and 10 parts of liquid paraffin were kneaded together on a roll. The kneaded mass was pressed into a plate 3 mm thick. The plate was passed through a pair of pressure rolls having the surface temperature maintained at 90° C and extended in one direction to 1.2 fold magnification. The plate was then stretched in the same direction at the same temperature as mentioned above, until the plate was extended to three times the original length. A strip obtained was soaked one day in hydrochloric acid at 3N concentration to dissolve out calcium carbonate from the strip. After water-washing and drying, the strip provided a single piece diaphragm 1.9 mm thick bored with micropores having a mean diameter of 1.9 microns. An electrolyte used consisted of a 23.5% aqueous solution of pure sodium chloride. As measured by the ethylenediamine-tetraacetic acid method, the contents of calcium and magnesium ions in said aqueous solution were only traces.

Electrolysis was continued about 30 hours with current density of 24 A/dm$^2$ at a cell temperature of 60° C, with the intraelectrode distance set at 13 mm. When measured after completion of electrolysis, the current efficiency amounted to 99.5%. The outflowing rate of catholyte changed with time as indicated by the curve B of FIG. 1. This curve B shows that said outflowing rate remained fully stable in the initial period of electrolysis. Namely, an aqueous solution of sodium chloride free from ions of calcium and magnesium did not give rise to the plugging of the above-mentioned single piece diaphragm bored with micropores, thus attaining good results.

REFERENCE 2

Electrolysis was effected of an aqueous solution of pure sodium chloride containing calcium ions in an electrolytic cell using the same type of diaphragm as that used in Reference 1. The diaphragm used in this experiment was prepared in substantially the same manner as in Reference 1, excepting that the proportions of polyethylene and heavy calcium carbonate were changed to 16 and 84 parts respectively. A diaphragm thus prepared was 1.8 mm thick and was bored with micropores having a mean diameter of 1.8 microns. An electrolyte used consisted of a 24.5% aqueous solution of pure sodium chloride to which calcium chloride was purposely added to adjust the concentration of calcium ions in said aqueous solution to 16.4 ppm. Electrolysis was effected with the other conditions kept unchanged from Reference 1. The outflowing rate of catholyte changed with time indicated by the curve C of FIG. 1. This curve C clearly shows that calcium ions exerted a noticeable effect.

REFERENCE 3

This experiment relates to the case where a layer formed on the anode side of a diaphragm was slightly thicker than in Example 1, though electrolysis was carried out with the same intention as in Example 1.

20 parts of polyethylene, 80 parts of calcium sulfite hemihydrate and 10 parts of liquid paraffin were kneaded together on a roll. The kneaded mass was pressed into a plate 3 mm thick. On the other hand, 25 parts of polyethylene, 75 parts of heavy calcium carbonate and 10 parts of liquid paraffin were kneaded together on a roll. The kneaded mass was pressed into a plate 1 mm thick. These two plates were joined together under heat and pressure. The joined mass was stretched in one way to 1.2 fold magnification on a roll having its surface temperature maintained at 90° C. The mass was further drawn in the same direction to twice the original length on another roll kept at the same temperature as mentioned above. A strip obtained was treated by the same process as in Example 1 to dissolve out calcium sulfite and calcium carbonate from the strip. After water-washing and drying, the strip provided a diaphragm 2.6 mm thick, whose anode side layer was 0.6 mm thick.

As inferred from the physical properties of separate microporous films prepared from the above-mentioned two plates respectively, the cathode side layer of the dual-layer diaphragm obtained in this Reference 3 was bored with micropores having a mean diameter of 8 microns and the anode side layer was bored with micropores having a mean diameter of 1.2 microns.

Electrolysis was carried out in the same manner as in Example 1 using the above-mentioned dual layer diaphragm and an electrolyte consisting of 24.5% concentrated sodium chloride and 17.2 ppm calcium ions. The outflowing rate of catholyte decreased with time in the same manner as in Reference 2. This was found to originate with the fact that the anode side layer of the diaphragm was exceedingly thick.

EXAMPLE 2

A long run of electrolysis was carried out in an electrolytic cell using a double-layer diaphragm made of polyvinylidene fluoride resin. This diaphragm was formed by the undermentioned process.

32 parts of polyvinylidene fluoride, 68 parts of calcium sulfite hemihydrate and 10 parts of dimethyl phthalate were kneaded together on a roll. The kneaded mass was pressed into a plate 4 mm thick. On the other hand, 28 parts of polyvinylidene fluoride, 72 parts of heavy calcium carbonate and 14 parts of dimethyl phthalate were kneaded together on a roll. The kneaded mass was pressed into a plate 0.5 mm thick, which in turn was stretched in one way on a roll having its surface temperature maintained at 140° C, until plate had its thickness reduced to 0.2 mm.

The pressed plate and stretched strip were joined under heat and pressure. The joined mass was drawn in one way to 1.3 fold magnification on a roll having its surface temperature kept at 140° C. The drawn joined mass was further stretched in the same direction to an extent twice the original length on another roll maintained at the same temperature as mentioned above. A new strip obtained was soaked one day in hypochloric acid at 3N concentration to dissolve out calcium sulfite and calcium carbonate from the strip. After water-washing and drying, the strip provided a diaphragm 3.3 mm thick. The cathode side layer of the dual layer diaphragm was 3.15 mm thick and was bored with micropores having a mean diameter of 8 microns, while the anode side layer of said diaphragm was 0.15 mm thick and was bored with micropores having a mean diameter of 0.6 micron.

Electrolysis was effected of the same kind of industrial brine supplied to the ordinary mercury process, which contained about 8 ppm of calcium and magnesium ions in total, under the following conditions.

| | |
|---|---|
| Current density | 24 A/dm$^2$ |
| Cell temperature | 54 to 68° C |
| Cathode size | 50 mm high, 100 mm wide |

Figure 2:
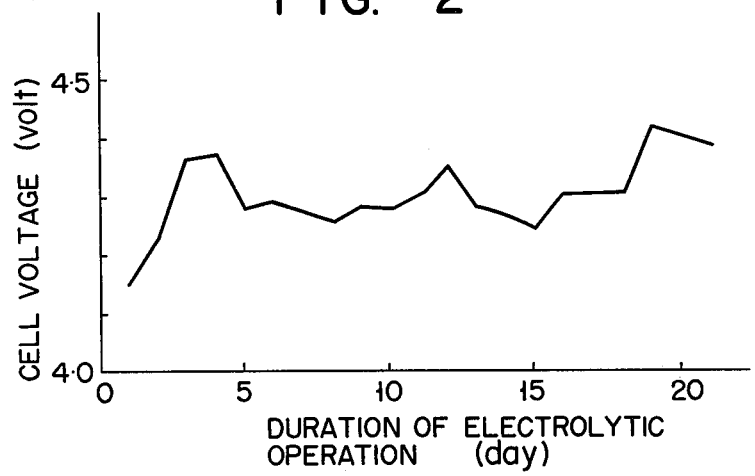
FIG. 2 is a graph showing the relationship between the duration of electrolysis and the cell voltage in Example 2.
Figure 3:
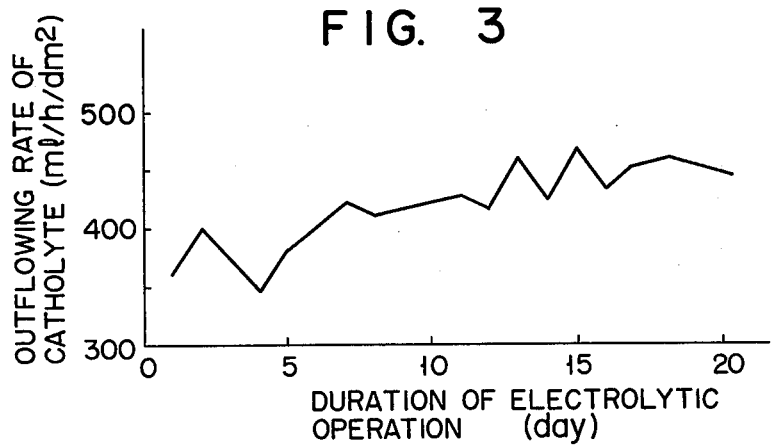
FIG. 3 is a graph showing the relationship between the duration of electrolysis and the outflowing rate of catholyte in Example 2.

Changes with time in the cell voltage and the outflowing rate of catholyte during a 3-week period after commencement of electrolysis are set forth in FIGS. 2 and 3 respectively. In this experiment, the outflowing rate of catholyte was controlled to fall within the range of 400 to 450ml/hr for every 1 dm$^2$ area of the cathode by adjusting a level difference between the anolyte and catholyte. Said level difference stood at 60 mm in the initial stage of electrolysis and at 120 mm in the later period. The cell voltage normally varying with the cell temperature indicated considerably small changes with time except for the first three days of electrolysis. Throughout the entire period of electrolysis, the current efficiency was desirably maintained at as high a level as 95 to 99%.

EXAMPLE 3

Electrolysis was carried out under the same conditions as in Example 2 with the diaphragm of Example 2 replaced by the undermentioned type. A dual-layer diaphragm used in Example 3 had its cathode side layer formed of two superposed plies of asbestos cloth measuring a thickness of 4.8 mm in total and had its anode side layer prepared from the same material as described under item II of Example 1.

Electrolysis was effected of the same kind of electrolyte as used in Example 2 with current density of 16A/dm$^2$ at a cell temperature of 46 to 48° C. On a third day after commencement of electrolysis, the cell voltage indicated 3.85 to 3.91 volts and the outflowing rate of catholyte stood at 220 ml/hr/dm$^2$, and throughout the entire period of electrolysis, the current efficiency was kept at 93 to 94%.

What we claim is:

1. In an electrolytic cell for producing an alkali hydroxide comprising a diaphragm dividing said cell into an anolyte chamber and a catholyte chamber, the improvement which comprises said diaphragm comprising a dual microporous layer having an anode side and a cathode side, the anode side microporous layer thereof being made of an acid-resistant material 0.01 to 0.3 millimeter thick bored with micropores having a mean diameter of from 0.05 to 1.5 microns, and the cathode side microporous layer thereof being made of an alkali-resistant material 1 to 6 millimeters thick bored with micropores having a mean diameter of from 3 to 100 microns.

2. The electrolytic cell of claim 1, wherein the acid-resistant material is a resin selected from the group consisting of chlorinated polyvinyl chloride and chlorinated polyvinylidene chloride.

3. The electrolytic cell of claim 1, wherein the alkali-resistant material is a resin selected from the group consisting of polytrifluoroethylene, polytetrafluoroethylene, polyvinylidene fluoride, a tetrafluoroethylene-hexafluoroethylene copolymer, and ethylene-tetrafluoroethylene copolymer, an ethylene copolymer and a tetrafluoroethylene-perfluoroacrylate copolymer.

4. The electrolytic cell of claim 1, wherein the acid-resistant material is a resin selected from the group consisting of chlorinated polyvinyl chloride and chlorinated polyvinylidene chloride, and the alkali-resistant material is a resin selected from the group consisting of polytrifluoroethylene, polytetrafluoroethylene, polyvinylidene fluoride, a tetrafluoroethylene-hexafluoroethylene copolymer, an ethylene-tetrafluoroethylene copolymer, an ethylene copolymer and a tetrafluoroethylene-perfluoroacrylate copolymer.

* * * * *